United States Patent
Nemit, Jr. et al.

(10) Patent No.: US 9,032,750 B2
(45) Date of Patent: May 19, 2015

(54) MANUAL VI ADJUSTMENT MECHANISM FOR SCREW COMPRESSORS

(71) Applicant: JOHNSON CONTROLS, INC., Holland, MI (US)

(72) Inventors: Paul Nemit, Jr., Waynesboro, PA (US); Angela Marie Comstock, Roanoke, VA (US); Shahebaz Malik, Mechanicsburg, PA (US)

(73) Assignee: Johnson Controls Technology Company, Holland, MI (US)

( * ) Notice: Subject to any disclaimer, the term of this patent is extended or adjusted under 35 U.S.C. 154(b) by 205 days.

(21) Appl. No.: 13/649,405

(22) Filed: Oct. 11, 2012

(65) Prior Publication Data
US 2013/0091892 A1 Apr. 18, 2013

Related U.S. Application Data

(60) Provisional application No. 61/548,304, filed on Oct. 18, 2011, provisional application No. 61/579,687, filed on Dec. 23, 2011.

(51) Int. Cl.
*F04C 28/10* (2006.01)
*F04C 18/16* (2006.01)
*F25B 1/047* (2006.01)
*F25B 49/02* (2006.01)
*F04C 29/12* (2006.01)

(52) U.S. Cl.
CPC ............... *F04C 18/16* (2013.01); *F04C 28/10* (2013.01); *F25B 1/047* (2013.01); *F25B 49/022* (2013.01); *F25B 2600/0253* (2013.01); *F04C 29/124* (2013.01); *Y02B 30/741* (2013.01)

(58) Field of Classification Search
CPC ...... F04C 29/12; F04C 29/124; F25B 49/022; F25B 1/047
USPC ............. 62/228.1, 228.5; 417/279, 310, 440, 417/441; 418/201.1
See application file for complete search history.

(56) References Cited

U.S. PATENT DOCUMENTS 5,979,168 A * 11/1999 Beekman .................... 62/228.5
2004/0234381 A1 * 11/2004 Hattori et al. .................. 417/53
2008/0209925 A1 * 9/2008 Pham .............................. 62/126
2012/0227437 A1 9/2012 Nemit, Jr. et al.

FOREIGN PATENT DOCUMENTS

WO 2010008457 A2 1/2010
WO 2012037229 A1 3/2012

OTHER PUBLICATIONS

"Plug Definition—Google Search." Plug Definition—Google Search. N.p., n.d. Web. Dec. 5, 2014.*
PCT International Preliminary Report on Patentability, 5 pgs, Sep. 6, 2013.
Amendment Under Article 34, 20 pgs, Aug. 1, 2013.

* cited by examiner

*Primary Examiner* — Jonathan Bradford
(74) *Attorney, Agent, or Firm* — McNees Wallace & Nurick LLC (57) ABSTRACT

A variable capacity screw compressor for use in a refrigeration system is provided. Compressed refrigerant gas from the compressor is expelled into a discharge port in fluid communication with the refrigeration circuit. The volume associated with the discharge port can be periodically varied, allowing the efficiency of the compressor to be varied periodically. The discharge port volume includes a penetration that houses a movable member or plug that permits the volume to be periodically varied. This movable member is accessible from the exterior of the compressor housing to adjust the position of the movable member within the discharge port volume. The movable member may be adjusted to a full open position in which the discharge port volume is maximized, to a full closed position in which the discharge port volume is minimized, and to any position between full open and full closed.

14 Claims, 7 Drawing Sheets

MANUAL VI ADJUSTMENT MECHANISM FOR SCREW COMPRESSORS

This application claims the benefit of U.S. Provisional Application No. 61/579,687 filed on Dec. 23, 2011 and U.S. Provisional Application No. 61/548,304 filed on Oct. 18, 2011.

FIELD OF THE INVENTION

This application is directed to screw compressors. More particularly, the present invention is directed to screw compressors having a variable volume capacity.

BACKGROUND OF THE INVENTION

In positive-displacement compressors, capacity control may be obtained by both speed modulation and suction throttling to reduce the volume of vapor or gas drawn into a compressor. Capacity control for a compressor can provide continuous modulation from 100% capacity to less than 10% capacity, good part-load efficiency, unloaded starting, and unchanged reliability. In some positive-displacement compressors, capacity can also be controlled by a slide valve employed in the compressor. The slide valve can be operated to remove a portion of the vapor from the compression chamber of the compressor, thereby controlling the capacity of the compressor. Besides the slide valve, other mechanical devices, such as slot valves and lift valves, may be employed in positive-displacement compressors to control capacity. Adjustments to capacity control valves or variable displacement mechanisms can meet the demands of the system. In a refrigeration system, capacity can be regulated based upon a temperature set point for the space being cooled. In other systems where the compressor is processing gas, capacity may be regulated to fully load the torque generator or prime mover (turbine or engine drive) for the compressor. However, all of the currently available methods are expensive and add to the initial cost of investment in the equipment.

In chiller applications where economy is desired both in the initial cost of the system and in operation of the system, a variable volume ratio application is desired. Volume ratio ($V_i$) is the ratio of the volume of a groove at the start of compression to the discharge volume when the discharge port begins to open. Hence, the volume ratio is determined by the size and shape of the discharge port, since the groove volume is a fixed volume at the start of compression.

For maximum efficiency, the pressure generated within the grooves during compression should exactly equal the pressure in the discharge volume when the discharge port begins to open. If this is not the case, either overcompression or undercompression occurs, both resulting in internal efficiency losses. Furthermore, overcompression can harm the compressor. Such losses increase power consumption and noise, while reducing efficiency. Volume ratio selection should be made according to operating conditions.

If the operating conditions of the system seldom change, it is possible to specify a fixed-volume ratio compressor that will provide good efficiency. Because overcompression can damage a compressor, a compressor is designed so that it does not frequently operate in an overcompression mode. As a result, such a compressor is designed to run at maximum compression under the most severe operating conditions, meaning that such a compressor runs in undercompression modes as service conditions dictate operation in maximum compression mode. What is needed is a system that permits adjustments to the volume ratio that changes the volume ratio depending on the conditions that the compressor experiences. This will allow the compressor volume to be adjusted to change the volume, and hence the volume ratio, as operating conditions change, allowing the compressor to operate at maximum efficiency. A variable volume ratio screw compressor that meets one or more of the above needs would be desirable in the art.

A variable volume ratio screw compressor that meets one or more of the above needs would be desirable in the art.

SUMMARY OF THE INVENTION

A screw compressor for use in a refrigeration system is provided. The screw compressor has a variable capacity and includes a motor connected to a power source. A control panel controls operation of the compressor, including the motor and power source. The screw compressor has a variable volume capability. The screw compressor comprises a pair of meshing helical lobed rotors rotating within a housing, the rotating rotors being driven by a drive shaft connected to the motor. The housing encloses the rotors or screws, which operate in a working chamber located within the housing.

Refrigerant gas enters the compressor inlet from the suction or low pressure side of the refrigerant circuit through an inlet port when the rotors are arranged in the chamber to maximum length. The space between the lobes of the rotors, the interlobe region, is filled with refrigerant and the inlet port is closed. The refrigerant is compressed between the rotors in the interlobe region as the rotors rotate with respect to one another, compressing the refrigerant gas and raising its pressure. The highly compressed gas is ejected from the rotor interlobe region as a high pressure gas, which is expelled into a discharge port in fluid communication with the refrigeration circuit.

The volume ratio is a measure of the efficiency of operation of a positive displacement compressor. The present invention permits efficiency of operation of a compressor to change with climate, which may be naturally variable with seasons. The volume ratio is determined by the size and shape of the discharge port. The volume associated with the discharge port, referred to as the discharge port volume, can be periodically varied in the present invention, also allowing the efficiency of the compressor to be varied periodically. The efficiency of a variable capacity screw compressor is determined by the position of a plug in the discharge port and by ambient temperature.

The discharge port volume includes a penetration that houses a movable member or plug. The movable plug or member allows the discharge port volume to be varied. This movable member is accessible from the exterior of the compressor housing when the compressor is shut down. The movable member can be accessed from the exterior of the housing to adjust position of the movable member within the discharge port volume. The movable member may be adjusted to a full open position in which the discharge port volume is maximized, to a full closed position in which the discharge port volume is minimized and to any intermediate position between full open and full closed. By adjusting the position of the movable member from one position to another, the volume in the discharge port can be modified, thereby modifying the volume ratio of the compressor, even as all other operating parameters remain constant.

An advantage of a screw compressor of variable volume having a volume adjustment mechanism is that a machine can be manufactured and the volume ratio periodically can be adjusted to maximize efficiency based on the climate of the area in which it is used with minimal disassembly of the compressor after shipment.

Another advantage of a screw compressor having a volume adjustment mechanism is that a machine can be procured based on a maximum volume ratio for the most severe conditions, but the volume ratio can be adjusted based on seasonal variations by using the volume adjustment feature with minimal disassembly of the compressor so that undercompression can be avoided when conditions are not severe.

In one embodiment, a variable capacity screw compressor, having a volume ratio adjustment mechanism, can be manufactured and the volume ratio periodically adjusted to maximize efficiency based on the climate of the area in which the compressor is used with minimal disassembly of the compressor.

In another embodiment, a variable capacity screw compressor having a volume ratio adjustment mechanism can be procured based on a maximum volume ratio for the most severe conditions. The volume ratio can be adjusted based on seasonal variations so that undercompression is avoided when conditions are not severe.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Provided is an exemplary variable capacity screw compressor for use in a refrigeration system. A volume ratio adjustment mechanism allows the volume ratio to be adjusted based on seasonal variations thus improving efficiency so that undercompression is avoided.

Figure 1:
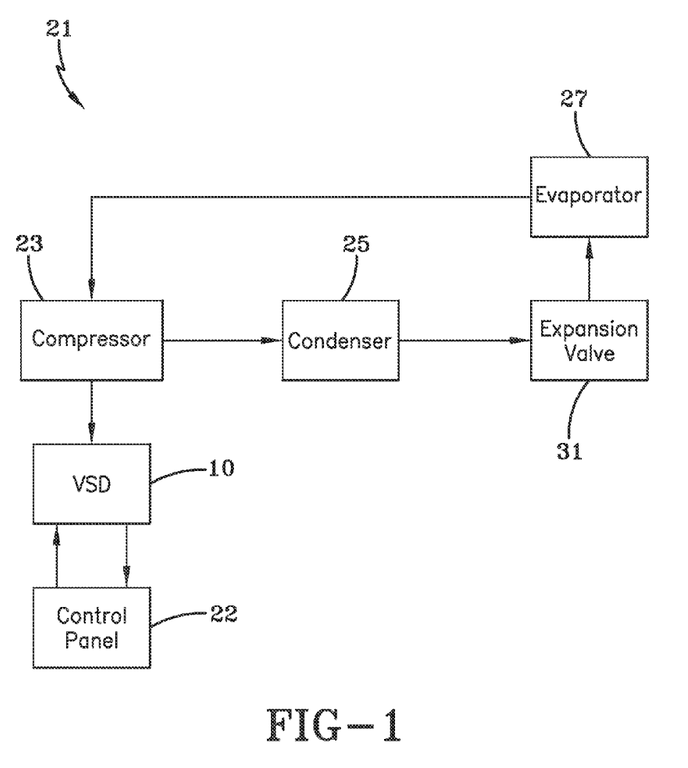
FIG. 1 depicts a refrigeration cycle.

Referring to FIG. 1, an exemplary refrigeration cycle is shown. The refrigeration cycle is a closed loop system 21 in which refrigerant, the working fluid, is compressed by a positive displacement compressor 23 that increases the pressure of the refrigerant gas. Compressor 23 is driven by a power source 10 that is controlled by a control panel 22. The high pressure refrigerant from compressor 23 is discharged through a compressor discharge port which is in fluid communication with a condenser 25 that condenses the high pressure gas into a pressurized fluid. In one embodiment, compressor 23 is a screw type. Alternatively, compressor 23 is a reciprocating, rotary, scroll, or centrifugal type compressor.

Condenser 25 is in heat exchange communication with a first heat transfer medium that removes heat of condensation resulting from the change of state of refrigerant from hot, high pressure gas to liquid. This heat transfer medium may be the atmosphere (air of forced air) or a liquid, preferably water. The various ways of removing this heat are well know and do not contribute to the inventive nature of this invention. The condensed fluid from condenser 25 is in fluid communication with an expansion valve 31 that expands at least some of the pressurized fluid into a gas as it flows within closed loop system 21. The closed loop system 21 from the discharge port 48 of compressor 23 to the expansion valve 31 is termed the high pressure side of the refrigeration system or circuit 21.

After the refrigerant passes through expansion valve 31 as a mixture of gas and liquid, its pressure is reduced. Evaporator 27 receives the refrigerant from expansion valve 31. Evaporator 27 is in heat exchange communication with a second heat transfer medium. The heat of absorption is absorbed by the refrigerant in evaporator 27 from the second heat transfer medium, as the liquid refrigerant undergoes a change of state to a vapor. As this heat is absorbed, the heat transfer medium is cooled. The heat transfer medium may be used directly to cool or refrigerate an area, for example when the heat transfer medium is air, or it may be used to cool a liquid, such as water and conveyed to another heat transfer device in an area or room, such as in water cooled chiller applications. In such applications, the chilled water is sent to the chiller and then sent to heat transfer devices in separate areas of a building on demand. The refrigerant gas from evaporator 27 is then returned to the suction side of compressor 23 to complete the circuit. Closed loop system 21 immediately after expansion valve 31 to the suction side of compressor 23 is termed the low pressure side of the system circuit.

Figure 2:
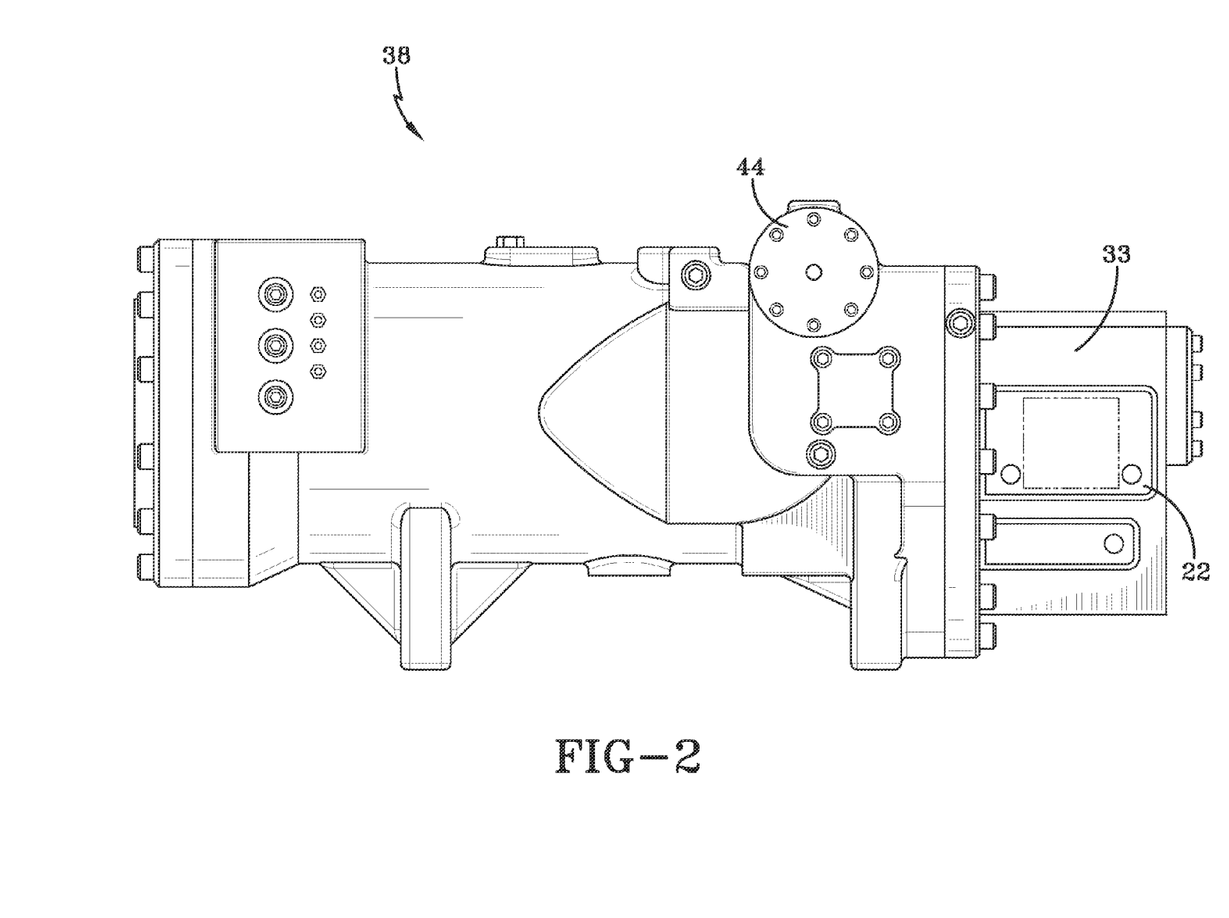
FIG. 2 schematically illustrates a typical screw compressor used in the refrigeration cycle of claim 1.
Figure 3:
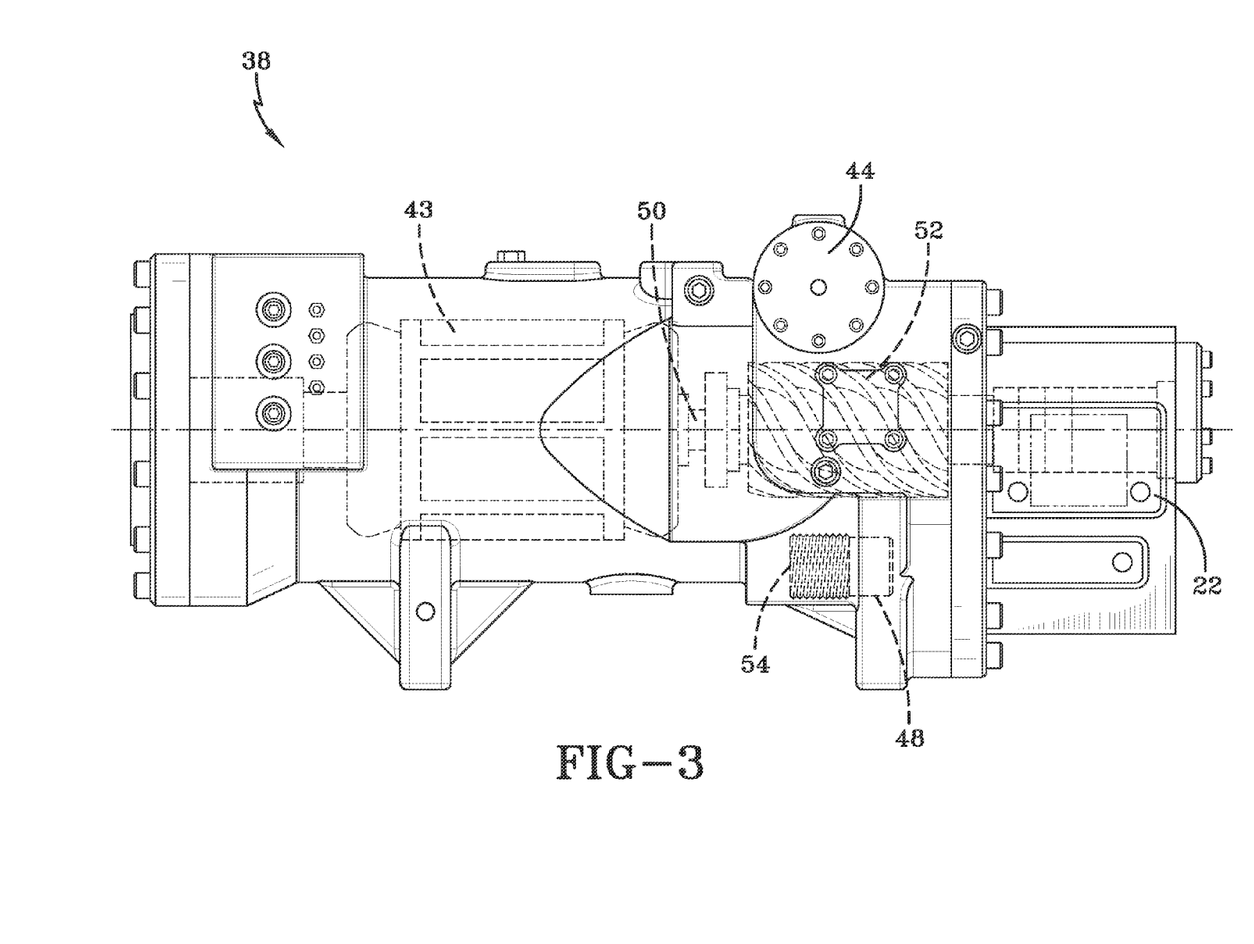
FIG. 3 depicts the screw compressor of FIG. 2 showing the interior components of the screw compressor through the housing, the view further showing the discharge port with a plug in the discharge port.

Referring to FIGS. 2 and 3, there is depicted a screw compressor 38 that may be used as compressor 23 in closed-loop refrigeration system 21 of FIG. 1. FIG. 3 depicts, in cut-away, some the interior components of screw compressor 38 through the compressor housing. Screw compressor 38 includes control panel 22 connected to a power source (not shown in FIG. 2), which is used to power a motor 43 that drives screw compressor 38. Although not shown, the screw compressor 38 includes a lubrication system as is known in the art. Lubrication systems include lubricating oils, (usually mineral oils which are completely dehydrated, wax-free and non-foaming), an oil pump to deliver oil under pressure to all bearing surfaces, and an oil separator. Oil is separated from the refrigerant gas as the refrigerant gas exits the high pressure side of the compressor. Oil is then returned to the low pressure side of the compressor to seal the clearance between the rotors, and between the rotors and the cylinder. Screw compressor 38 is in fluid communication with an oil separator (not shown). Refrigerant gas from evaporator 27 and lubricating oil are introduced into the suction side of screw compressor 38 at inlet port 44 to lubricate the rotors of the compressor. A lubricant is also introduced into the screw compressor to lubricate the rotors of the compressor. Once compressed within screw compressor 38, the mixture of high pressure refrigerant gas and lubricating oil is discharged into an oil separator where the mist of lubricating oil in the form of finely divided particles entrained in the refrigerant gas is separated from the refrigerant gas. After separation, the refrigerant gas exits the oil separator through its discharge port 48 and is provided to condenser 25 in the closed loop system 21.

In FIG. 3, the internal mechanisms of the screw compressor 38 can be seen. A shaft 50 extending from motor 43 is connected to at least one of a pair of helically-grooved rotors 52. One rotor may be stationary or both rotors may be driven by the use of rotor-synchronized timing gears that synchronizes their rotation. Refrigerant enters screw compressor 38 through inlet port 44 and is compressed between the lobes of the rotors 52. The compressed gas is discharged into discharge port 48 which is in communication with the downstream condenser 25 in closed loop system 21. As can be seen in FIG. 3, a plug 54 is positioned within discharge port 48. Although plug 54 is locked into position, it may be unlocked and moved from a first position to a second position.

Figure 4:
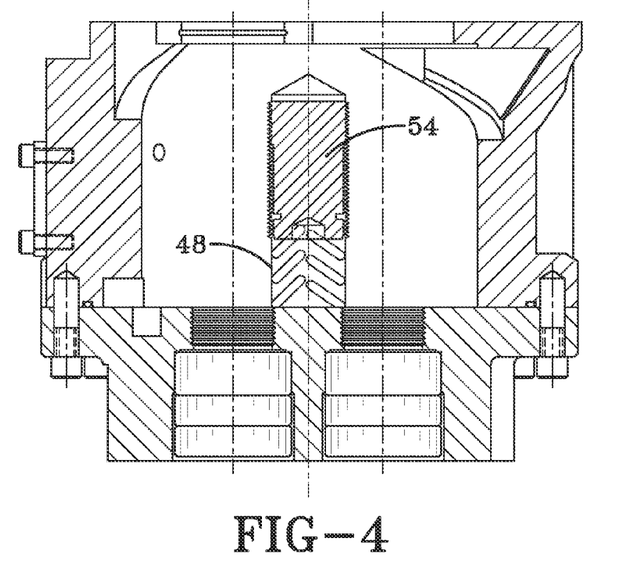
FIG. 4 depicts a partial horizontal cross sectional view of the screw compressor through its center, viewed from above, providing a detail view of the discharge port, viewed from above, with the movable plug positioned in the discharge port to provide it with maximum volume.

FIG. 4 is a partial horizontal cross-sectional view of the screw compressor 38 through its center viewed from above, providing a detail view of discharge port 48. In FIG. 4, rotors 52 are not visible, as the view is taken below the rotors. However, this view clearly shows the path taken by refrigerant into discharge port 48. Plug 54 is depicted as threaded into discharge port 48 in FIG. 4, although the method of inserting plug 54 into discharge port 48 is not limited to threading, and any other well-known method of assembling and locking plug 54 into a bore may be used. When threading is utilized, plug 54 and discharge port 48 have matching threads. In FIG. 4, plug 54 is shown fully inserted into discharge port 48, providing discharge port with the maximum possible volume.

Figure 5:
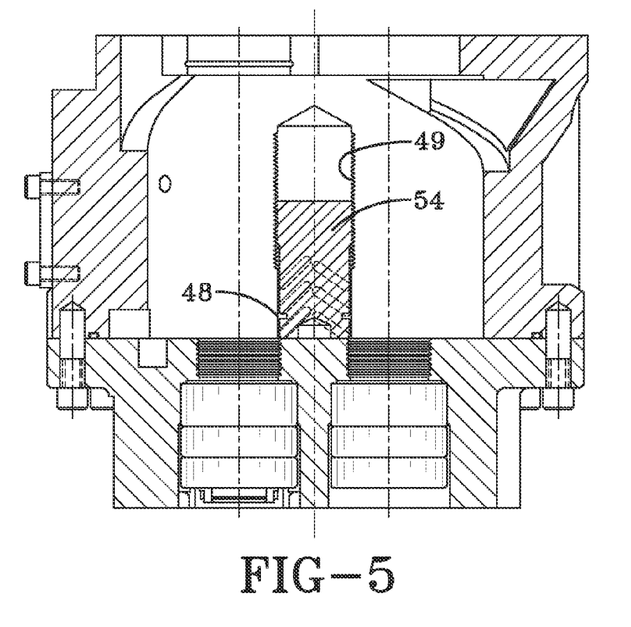
FIG. 5 depicts a partial horizontal cross sectional view of the screw compressor through its center, viewed from above, providing a detail view of the discharge port, viewed from above, with the movable plug positioned in the discharge port to provide it with minimum volume.

FIG. 5 is a partial horizontal cross sectional view of the screw compressor 38 through its center viewed from above, providing a detail view of discharge port 48. FIG. 5 is identical to FIG. 4, except that plug 54 is threaded into discharge port 48 so that the discharge port has a minimum volume. As shown in FIG. 5, plug 54 is threaded to a second position that provides discharge port with a minimum volume and exposed threads 49 of discharge port 48 are visible as plug 54 is not fully threaded into discharge port 48 in FIG. 5.

FIG. 4 and FIG. 5 depict plug 54 inserted into discharge port 48 in two positions, a first position in which the discharge port 48 has a maximum volume (FIG. 4) and a second position in which the discharge port 48 has a minimum volume (FIG. 5), respectively. It will be understood by those skilled in the art, that plug 54 may be inserted into discharge port 48 at any position from the first position depicted in FIG. 4 to a second position depicted in FIG. 5 to provide a variable volume dependent on the location of plug 54 in port 48. Plug 54 generally may be fabricated of a relatively dense material, such as steel, so that the inertia of plug 54 within bore 48 is sufficient to prevent movement during operation of screw compressor 38. Additionally, plug 54 has a self locking feature, for example, a spring, a chemical additive, a prevailing torque feature having a deflective or distorted thread type, or any combination thereof.

As previously noted, volume ratio $V_i$ is related to the discharge volume. More specifically, the volume ratio is provided as:

$$V_i = \epsilon^{1/\kappa}$$

where
$V_i$ is the volume ratio
$\epsilon$ is compression ratio and
$\kappa$ is a refrigerant constant. For refrigerant 134A, $\kappa$ is 1.8.

When plug 54 is in its first position, as shown in FIG. 4, in which discharge port has its maximum volume, high pressure refrigerant gas is discharged from compressor lobes into discharge port 48 and achieves its minimum volume ratio. The volume ratio $V_i$ is the ratio of the suction volume to the discharge volume. In this first position, the suction volume is the volume of the interlobal region before compression. The discharge volume is the volume of the meshing rotors just prior to the opening to the discharge port area. Since the discharge port volume 48 is at its maximum due to the position of plug 54, the volume ratio $V_i$ for the system is at a minimum. In this position, the operation of the screw compressor 38 and the refrigeration system 21 is most efficient in cooler climates and during cooler months in late autumn, winter and early spring.

When plug 54 is in its second position, as shown in FIG. 5, in which discharge port 48 has its minimum volume, high pressure refrigerant gas is discharged into the discharge port 48 and achieves its maximum compression ratio. The volume ratio $V_i$ is the ratio of the suction volume to the discharge volume. In this second position, the suction volume is the volume of the interlobal region before compression. The discharge volume is the volume of the meshing rotors just prior to the opening to the discharge port area. Since the volume of the discharge port 48 is at its minimum, the volume ratio $V_i$ for the system is at a maximum. In this position, the operation of the screw compressor 38 and the system is most efficient in warmer climates or during warmer months in late spring, summer, and early autumn.

It will also be recognized by those skilled in the art that the volume ratio $V_i$ may also be adjusted, if desired, between the extremes shown in FIGS. 4 and 5. An intermediate adjustment may be more desirable for seasonal changes and provide improved efficiency for autumn and spring rather than an adjustment selection using one of the extreme positions depicted in either FIG. 4 or 5.

In operation, plug 54 is moved to its second position depicted, in FIG. 5, to provide the discharge port with its minimum volume for warmer climates and/or summer conditions. In a season in which warmer weather is expected or wherein the compressor is in a system located in a warmer climate, a higher volume ratio $V_i$ is required. Higher temperatures require higher operating pressures, and the minimum discharge port volume provides higher pressures. The discharge port pressure dictates the downstream pressure at the evaporator. The increase in pressure represents an increase in work performed by the compressor 38. The increase in work represents an increase in energy usage by the screw compressor 38, but the screw compressor 38 is operated in a more efficient manner. In one embodiment, by matching the volume ratio $V_i$ to the season or the climate, not only is the compressor operated more efficiently, but noise from screw compressor 38 operations is also reduced.

In operation, plug 54 is moved to its first position depicted in FIG. 4 to provide the discharge port 48 with its maximum volume for cooler climates and/or winter conditions. In a season in which cooler weather is expected or wherein the screw compressor 38 is in a system located in a cool climate, a lower volume ratio $V_i$ is required. Cooler ambient temperatures permit lower operating pressures, and the larger discharge port volume provides lower pressures. The reduced discharge port pressure decreases the downstream pressure at the evaporator, which in turn provides less cooling capacity. In one embodiment, the reduction in pressure represents a decrease in work performed by screw compressor 38, which results in increased screw compressor 38 efficiency in cold conditions.

Discharge port 48 and movable plug 54 are located in the interior of screw compressor 38, as can be seen in FIGS. 2 and 3. Plug 54 is not readily accessible from the exterior of screw compressor 38. In order to access plug 54 to move it from a first position to a second position, or any intermediate position, compressor cover 33 must be removed to access the interior of the screw compressor 38. In one embodiment, prior to removing compressor cover 33, screw compressor 38 must be shut down and the pressure within screw compressor 38 must be allowed to equalize to atmospheric pressure and the refrigerant must be removed from the system. In another embodiment, the screw compressor 38 is isolated from closed loop system 21 and refrigerant must be removed from screw compressor 38. Because this is not a simple procedure and requires shutting screw compressor 38 down, repositioning plug 54 cannot be done on a daily or even a weekly basis. Repositioning of plug 54 is best done on a seasonal or even a semi-annual basis.

Figure 6:
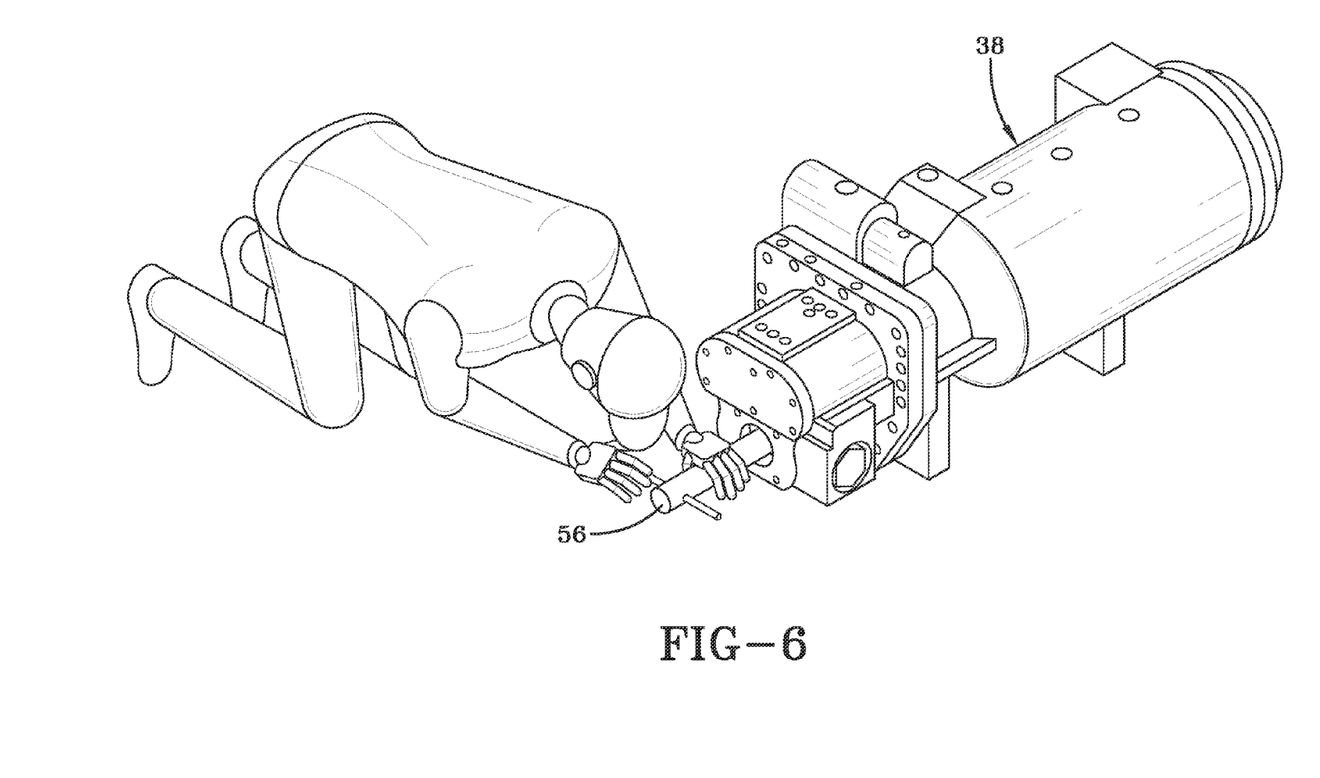
FIG. 6 depicts a worker inserting a tool into the screw compressor to modify the location of the movable plug within the discharge port.
Figure 7:
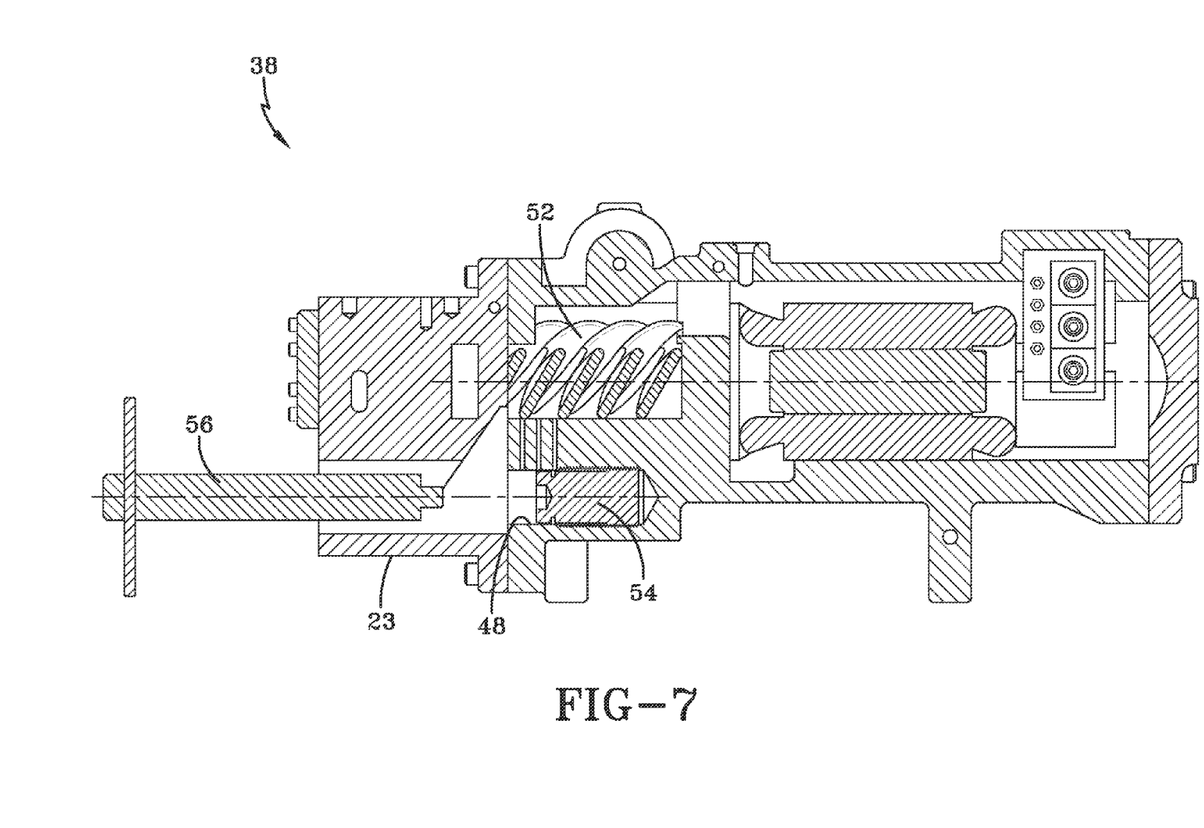
FIG. 7 depicts the compressor in cross section, with the cover removed, showing the tool partially inserted into the compressor.

Referring now to FIG. 6, screw compressor 38 is depicted with cover 33 removed. A worker is shown inserting a tool 56 to engage plug 54. Tool 56 is inserted into the end of screw compressor 38 and engages the end of plug 54. The worker then moves plug 54, such as by rotating it either clockwise or counterclockwise, from a first position to a second position. FIG. 7 depicts tool 56 being inserted into screw compressor 38 after cover 33 has been removed from screw compressor 38. Tool 56 is shown as partially inserted, and the tool head is visible out of contact with plug 54 in discharge port 48, with plug 54 being in first position to provide discharge port 48 with its maximum volume.

Figure 8:
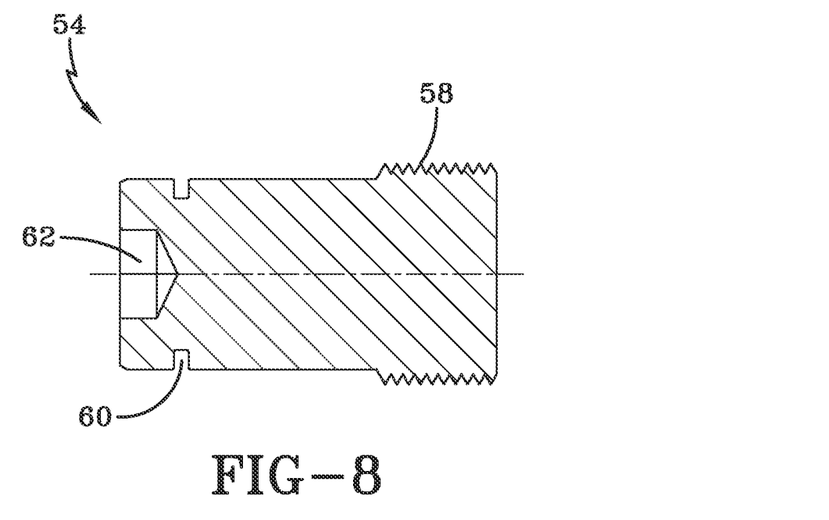
FIG. 8 depicts the plug of FIG. 7 in cross section.
Figure 9:
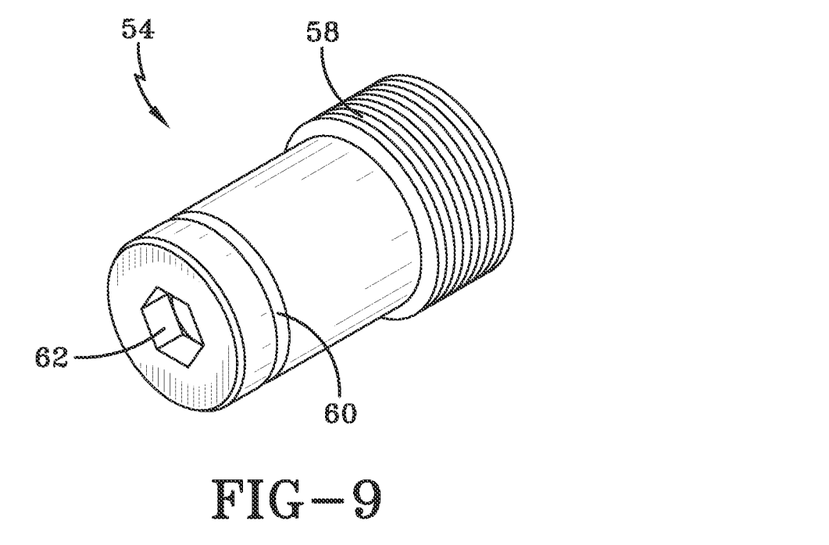
FIG. 9 is a perspective view of the plug of FIG. 8.

Plug 54 is shown in greater detail in FIG. 8, a cross-section view, and in FIG. 9, a perspective view. In a preferred embodiment as shown in FIG. 8, plug 54 is threaded with external threads while discharge port 48 includes internal threads 49. However, plug 54 may be positioned within discharge port 48 using any other mating method. For example, plug 54 may include spring loaded projections that can be aligned into a series of mating apertures at different locations along discharge port 48. Alternatively, plug 54 may be slidable from a first position to a second position along discharge port 48, and locked into position by rotating, for example, 90°. The exact mechanism used to position plug 54 within discharge port 48 is not critical to the operation of the invention. Plug 54 further includes at least one o-ring groove 60 for insertion of an o-ring. O-rings consist of neoprene, chloroprene, and other fluid-resistant elastomeric compounds. Positioning an o-ring in this groove when assembled into discharge port 48 prevents leakage of refrigerant around plug 54. Additionally, seals to prevent leakage of refrigerant for use in combination with plug 54 include compression seals, mechanical seals, and the like.

The position of plug 54 within discharge port 48 can be determined by any convenient method. For example, the total number of rotations that plug 54 can make within discharge port 48 is known. When plug 54 is fully inserted into discharge port 48 as shown in FIG. 4, discharge port 48 has a maximum volume suitable for summer conditions and plug 54 is at maximum travel within discharge port 48 (i.e. fully inserted). The number of rotations required to move plug 54 from the position shown in FIG. 4 to the position shown in FIG. 5 is known or can be determined, and the worker can count the number of rotations when changing the position of plug 54. A position of the plug 54 for autumn or spring conditions can also be determined on the basis of rotations from hot or warm positions. In another embodiment, screw compressor 38 and plug 54 include index lines or marks adjacent to the aperture wherein tool 56 is inserted to interface with plug 54. The index lines can be related to the position of the plug within the aperture, which can be related to the discharge port volume. In yet another embodiment, tool 56 includes a series of scribe lines which can be matched to the index line, each scribe line corresponding to a position of the plug 54 for a particular season. In another embodiment, tool 56 may be provided in different lengths, each length corresponding to a different season, corresponding to a desired location of plug 54. Plug 54 first may be moved to the position shown in FIG. 4 and then the appropriate tool can be inserted to move plug 54 to its proper position.

In one embodiment, plug 54 includes a feature that mates with a corresponding feature on tool 56. As shown in FIGS. 8 and 9, this feature is by way of example, but not limited to, a hex shaped aperture 62 on plug 54, and tool 56 includes, a corresponding hex-shaped head, that can be inserted into the aperture on plug 54. The shapes are not limited and any other shape may be used. In addition, the head and aperture may be reversed so that plug 54 includes the head and tool 56 includes the aperture. Any other configuration for mating tool 56 to plug 54 to facilitate movement of plug 54 within discharge port 48 may be used.

By use of a discharge port, such as discharge port 48 with a plug 54 to provide a variable volume discharge port, a screw compressor 38 may be fabricated for use in cold climates or warm climates. The volume ratio $V_i$ of the screw compressor 38 can be adjusted manually to provide the volume ratio $V_i$ most suitable for the climate in which the screw compressor 38 is used. Additionally, a screw compressor 38 having a manually variable volume ratio $V_i$ can be adjusted seasonally to provide screw compressor 38 with the volume ratio $V_i$ most suitable for the season, while also providing improved efficiency.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A variable efficiency refrigeration system having a variable efficiency screw compressor, comprising:
   an inlet port to draw a refrigerant into the compressor;
   a pair of helically grooved rotors in fluid communication with the inlet port to compress the refrigerant from a first low pressure to a second higher pressure;
   a discharge port in fluid communication with the rotors that receives the refrigerant at the second higher pressure and discharges the refrigerant;
   a power source powering the compressor;
   a control panel modulating the power source;
   a condenser in fluid communication with the compressor that condenses the refrigerant gas at the second higher pressure to a pressurized liquid;
   an evaporator in fluid communication with the condenser and with the compressor;
   an expansion valve positioned between the condenser and the evaporator, wherein the expansion valve receives the condensed pressurized refrigerant fluid and expands it to a lower pressure mist of gas and liquid for the evaporator; and a plug positioned within the discharge port and manually movable within the discharge port from the exterior of the compressor from a first position to a second position, the plug providing the discharge port with a variable volume, in which the volume is at a maximum in the first position and in which the volume is at a minimum in the second position, the plug being movable to any intermediate position between the first position and the second position to provide an intermediate volume.

2. The refrigeration system of claim 1, wherein the position of the plug in the discharge port is determined by a seasonal ambient temperature.

3. The refrigeration system of claim 1, wherein the plug is accessible from the exterior of the compressor when the compressor is shut down.

4. The refrigeration system of claim 1, wherein the discharge port includes a threaded bore and the plug includes mating threads, the plug being positioned within the bore.

5. The refrigeration system of claim 2, wherein the seasonal ambient temperature is an average ambient temperature experienced in a geographic location in a season.

6. The refrigeration system of claim 1, wherein a volume ratio determined by a volume of lobes in the helically-grooved rotors, to the volume of the discharge port, is adjusted by adjusting the plug position based on seasonal average ambient temperature to avoid undercompression.

7. The refrigeration system of claim 1, wherein efficiency of the compressor is increased in cold ambient conditions.

8. The refrigeration system of claim 1, wherein increased efficiency of the compressor further includes reduced noise from the compressor.

9. The refrigeration system of claim 1, wherein the compressor and plug include index marks to position the plug into a desired position.

10. The refrigeration system of claim 1, wherein the plug has a feature that mates with a corresponding feature on an adjusting tool.

11. The refrigeration system of claim 1, further including water in heat exchange communication with the evaporator, the water after being cooled by the evaporator being provided to a chiller, wherein the chilled water from the chiller can be used to cool a remote area.

12. The refrigeration system of claim 1, further including a heat transfer medium in heat exchange communication with the evaporator, wherein the heat transfer medium cooled by the evaporator cools an immediate area.

13. The refrigeration system of claim 1, wherein the refrigeration system is a closed loop system.

14. The refrigeration system of claim 1, wherein the compressor is manufactured and the volume ratio is adjusted to maximize efficiency based on the climate of a geographic area in which the compressor is used.

* * * * *